(12) United States Patent
Glazer et al.

(10) Patent No.: US 9,924,238 B2
(45) Date of Patent: Mar. 20, 2018

(54) METHOD AND A SYSTEM FOR USING A COMPUTERIZED SOURCE DEVICE WITHIN THE VIRTUAL ENVIRONMENT OF A HEAD MOUNTED DEVICE

(71) Applicant: SCREENOVATE TECHNOLOGIES LTD., Ra'anana (IL)

(72) Inventors: Joshua Glazer, Ra'anana (IL); Sagiv Philipp, Raanana (IL); Amit Perelstein, Ramat Hasharon (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 0 days.

(21) Appl. No.: 15/464,664

(22) Filed: Mar. 21, 2017

(65) Prior Publication Data

US 2017/0272838 A1 Sep. 21, 2017

Related U.S. Application Data

(60) Provisional application No. 62/310,926, filed on Mar. 21, 2016.

(51) Int. Cl.
| | |
|---|---|
| *G09G 5/00* | (2006.01) |
| *H04N 21/81* | (2011.01) |
| *H04N 21/61* | (2011.01) |
| *G06T 19/20* | (2011.01) |
| *G06F 3/01* | (2006.01) |
| *H04N 21/2385* | (2011.01) |
| *G06F 3/16* | (2006.01) |
| *H04N 21/41* | (2011.01) |

(52) U.S. Cl.
CPC ......... *H04N 21/8146* (2013.01); *G06F 3/012* (2013.01); *G06F 3/017* (2013.01); *G06F 3/167* (2013.01); *G06T 19/20* (2013.01); *H04N 21/2385* (2013.01); *H04N 21/4122* (2013.01); *H04N 21/6106* (2013.01)

(58) Field of Classification Search
None
See application file for complete search history.

(56) References Cited

U.S. PATENT DOCUMENTS

| | | | | |
|---|---|---|---|---|
| 2002/0077830 | A1* | 6/2002 | Suomela | G10L 15/26 704/275 |
| 2009/0033737 | A1* | 2/2009 | Goose | G06F 3/0481 348/14.07 |
| 2009/0315915 | A1* | 12/2009 | Dunn | H04M 1/72544 345/632 |

(Continued)

*Primary Examiner* — Ilana Spar
*Assistant Examiner* — Kirk Hermann
(74) *Attorney, Agent, or Firm* — Browdy and Neimark, PLLC

(57) ABSTRACT

A method for allowing/supporting the usage of a computerized source device within a simulated virtual environment produced by a head mounted device associated with at least one processor. The method includes presenting at least one icon of at least one identified available source device within the virtual reality environment simulated by the head mounted device, enabling the user to select at least one icon using an applicable GUI interface at the head mounted device and projecting a 3D object which has at least one surface which displays the mirrored 2D image of the source device within the simulated virtual reality environment.

22 Claims, 18 Drawing Sheets

(56) References Cited

U.S. PATENT DOCUMENTS

| | | | |
|---|---|---|---|
| 2015/0213650 A1* | 7/2015 | Barzuza | G06T 19/006 348/14.07 |
| 2016/0131908 A1* | 5/2016 | Fateh | G06F 3/147 345/633 |
| 2016/0227164 A1* | 8/2016 | Klug | G02B 5/1842 |
| 2016/0335801 A1* | 11/2016 | Yoon | G06F 3/0481 |

* cited by examiner

Streaming video and Head gestures of head-mounted camera module 100A

The head mounted display unit may optionally be constantly receiving a video stream from the head-mounted camera module 100A                                    112A The Head gestures module (500) monitors user head movement within the 3D VR environment                                    114A In case of identifying gazing towards a predefined direction:

• Stream the video from the camera device to the head-mounted display unit

• Enable the presentation of the streamed video within the virtual reality environment.

116A

Continuously displaying the streaming video as long as the user is gazing at the predefined location.

When the user shifts his/her viewpoint, thus ceasing his/her gaze at the predefined location, the streaming of video (and its display in the VR environment ) is stopped.

Streaming video and Head gestures of external camera, adjacent the source device (100B) or independently located (100C)

The head mounted display unit may optionally be constantly receiving a stream of video from an external camera device (100B/100C)   112B Optionally displaying said camera stream of video in the virtual environment   114B Identifying user gesture either by:

- Movement direction within the virtual realty environment,
- Head gestures via the Head gestures module (500)
- Hand gestures via the Motion detection module (800)

116B

Optionally reacting to the said user's gesture, for example by:

- Activating the external camera's video streaming (350 or 110C), to receive streaming video from external cameras (100B, 100C respectively)
- Employing the VR display integrator (1000) to present the said streaming video within the virtual reality environment

VR display integrator 1000

Integrating multiple streams for display

VR display integrator 1000

Integrating multiple streams for display

Optionally relating to the source focus information:

•Upon detection of a source device beyond the user's angle of view, stopping the mirroring of content from the said device to the head mounted device, and the displaying thereof.

•Upon detection of multiple source devices within the user's angle of view, mirroring and displaying the mirrored content with moderate resolution

• Upon detection of the source device under focus (e.g. in direct line of sight), mirroring and displaying the content of the said device with high resolution in comparison to other source device detected within the user's angle of view    1028

Optionally identifiying markers in the real world (e.g. bar codes, QR codes), and disaplay predefined virtual items would be displayed in the 3D VR environment.    1030

Integrating the altered video streams and mirrored content from all selected devices to a comprehensive VR display    1032

Obtaining alerts that have been received by the VR-Alert module (400), and incorporating them in the VR display    1034

Figure 9

Source- Mirroring module 350:

Mirroring source device display to the VR Head mounted display unit

Source- Downlink module 950:

Receiving information from the head mounted display device, and optionally applying respective actions on the source device Source Alert module 450:

Sending alerts regarding source device events to the Head mounted display unit

METHOD AND A SYSTEM FOR USING A COMPUTERIZED SOURCE DEVICE WITHIN THE VIRTUAL ENVIRONMENT OF A HEAD MOUNTED DEVICE

RELATED APPLICATION DATA

The present application claims priority from U.S. Provisional Patent Application No. 62/310,926, filed on Mar. 21, 2016 and incorporated herein by reference.

TECHNICAL FIELD

The present invention relates to the field of Manipulating 3D models or images for computer graphics, and more particularly to the field of mixed reality.

SUMMARY OF INVENTION

The present invention provides a method for supporting the usage of at least one computerized source device from within a simulated Virtual Reality (VR) environment, produced by a head mounted VR device, implemented by one or more processors operatively coupled to a non-transitory computer readable storage device, on which are stored modules of instruction code that when executed cause the one or more processors to perform:
  receiving content of the at least one source device display as streaming video data from the said source device;
  presenting a virtual 3-D surface within the VR environment;
  displaying the said video content within the VR environment, as a 2-D video projection over the said virtual 3-D surface.

According to some embodiments the method further comprising the following steps of:
  identifying head gestures, tilts and movements of the head-mounted VR display device;
  moving, rotating or titling said 3-D surface in the VR space, in association with said identified head gestures, tilts and movements of the head-mounted VR device;
  moving or altering said streaming video projection in association with said identified head gestures, tilts and movements of the head-mounted VR device, as if the projected video has moved, rotated or tilted with the surface of the 3D object.

According to some embodiments the method further simulate the effect of a real-life field of view in the VR environment, and conserve bandwidth of streaming data from source devices that are not within the user's direct line of sight, wherein in case of identifying the projected display of a source device lies beyond the user's angle of view in the VR environment, the system will stop streaming of video content from the said device to the head mounted virtual reality device, and the display thereof.

According to some embodiments the method relating to different levels of focus of the projected video in the virtual reality environment, in accordance with the user's angle of view and line of sight, to simulate the effect of a real-life field of view in the VR environment, and conserve bandwidth of streaming data from source devices that are not within the user's direct line of sight, wherein, in case of identifying the projected display of a source device lies within the user's angle of view, but not in the direct line of sight, the system will mirror the video content of the said source devices to the head mounted virtual reality device, and display the said content in moderate resolution adapted to the relative location of the device within the line of sight.

According to some embodiments the at least one computerized source device is connected to the head-mounted VR device via wired or wireless local area network (LAN), or wide area network (WAN).

According to some embodiments user of the head-mounted VR device can select which computerized source device display or non-display-visual-content video stream to present as projected video in the VR environment.

According to some embodiments the method further enabling the user of the head-mounted VR device to interact with the said video projection(s) of the mirrored source device display(s), by means of identifying head movements and limb gestures, so as to apply actions on the said projection(s).

According to some embodiments the said actions are applied to the actual source device(s).

According to some embodiments the method further enabling the user of the head-mounted VR device to verbally interact with the said video projection(s) of the mirrored source device display(s), said method comprising the steps of:
  emitting a verbal instruction by the user of the head-mounted VR device;
  recognizing the verbal instruction as one of a list of predefined verbal instructions by applying a voice recognition algorithm;
  applying the said recognized verbal instruction on the said video projection(s) of the mirrored source device display(s).

According to some embodiments the method further enabling the sharing of the said VR environment among multiple users of head-mounted VR devices, wherein each such user is able to view and interact with all of, or a subset of the projected video of mirrored source device display or video stream originating from the at least one source device.

According to some embodiments the method further enabling the user(s) of the VR display device(s) to copy or move data residing on one source device in one location to a different location, on that source device or on another source device, said method comprising the steps of:
  enabling the user to select a first source device;
  enabling the user to select specific content within a first location on the said first source device;
  enabling the user indicate of moving or copying the said selected content from the first location on the first selected source device to a second location, either on the same source device or on a different source device, by identifying the user's head gestures or limb movements; and
  copying or moving the said selected content from the first location to the second location, either directly or via a memory device associated with the VD display device.

According to some embodiments the method further enabling the user(s) of the VR display device(s) to be alerted of the occurrence of any predefined event on any source device which is displayed within the VR environment.

The present invention provides a system for supporting the usage of at least one computerized source device from within a Virtual Reality (VR) environment, produced by a head mounted VR device, comprising a non-transitory computer readable storage device and one or more processors operatively coupled to the storage device on which are stored modules of instruction code executable by the one or more processors, said system comprised of:

a VR mirroring module, for receiving video streams of source device display from at least one source device; and a VR display integrator module, for projecting the 2-D display of the at least one source device over at least one virtual 3-D surface within the VR environment.

According to some embodiments the system further comprising a head gestures module, which identifies head gestures, tilts and movements of the head-mounted VR display device, wherein the said VR display integrator module further moves the said 3-D surfaces and projected video in the VR space, in association with said identified head gestures, tilts and movements of the head-mounted VR device.

According to some embodiments the head gestures module identifies a condition in which the projected video of a source device lies beyond the user's angle of view in the VR environment, in which case:

the VR display integrator stops the display of projected video of mirrored content from the source device that is out of the user's focus; and the VR mirroring module consequently stops streaming video content from the said device to the head mounted virtual reality device, thus conserving bandwidth of streaming data from source devices that are out of the user's focus.

According to some embodiments the head gestures module identifies a condition in which the projected video of a source device lies within the user's angle of view, but not in the direct line of sight, in which case:

the VR display integrator displays the projected video from the said source device(s) in moderate resolution, wherein the moderated resolution is adapted to the relative location of the device within the line of sight; and the VR mirroring module consequently consumes moderate bandwidth for the video stream of the said device, thus conserving bandwidth of streaming data from source devices that are out of the user's focus, the system simulates the effect of a real-life field of view in the VR environment.

According to some embodiments the at least one computerized source device is connected to the head-mounted VR device via wired or wireless local area network (LAN), or wide area network (WAN).

According to some embodiments the system further comprising a source selection module, enabling the user of the head-mounted VR device to select which computerized source device display and/or video stream to display in the VR environment.

According to some embodiments the system further comprising a motion detection module, enabling the user of the head-mounted VR device to interact with the said video projection(s) of the mirrored source device display(s), and apply actions on the said video projection(s) by means of:

identifying head movements by the said head gestures module; and identifying limb gestures by the said motion detection module.

According to some embodiments the system further comprising a voice detection module, enabling the user of the head-mounted VR device to interact with the said video projection(s) of the mirrored source device display(s), and apply actions on the said video projection(s) by means of emitting verbal instructions.

According to some embodiments the system further comprising a VR-Downlink module, enabling actions that are applied to video projections in the VR environment by means of verbal instructions or head gestures or limb movements to be applied to the actual source device(s).

According to some embodiments the system further comprising a VR alerts module, enabling the user(s) of the VR display device(s) to be alerted of the occurrence of any predefined event on any presented source device.

According to some embodiments the system further comprising a sharing module, enabling the sharing of the said VR environment among multiple users of head-mounted VR devices, each such user able to view and interact with all of, or a subset of the said projections of the said mirrored source devices.

According to some embodiments the system further enabling the user(s) of the VR display device(s) to copy and/or move data residing in a first location on a first source device to a second location, either on the first source device or on a second source device, wherein:

the source selection module enables the user to select a first source device; and the head gestures module and/or motion detection module respectively identifying head gestures and/or limb movements, enabling the user to select specific content within a first location on the said first source device;

According to some embodiments the system the head gestures module and/or motion detection module respectively identifying head gestures and/or limb movements, enabling the user to indicate their will to move or copy the said selected content from the first location to a second location on the first source device or on a second source device; copying or moving the said selected content from the first location to the second location, either directly or via a memory device associated with the VD display device.

These, additional, and/or other aspects and/or advantages of the present invention are set forth in the detailed description which follows; possibly inferable from the detailed description; and/or learnable by practice of the present invention.

BRIEF DESCRIPTION OF DRAWINGS

FIG. 6 is a flowchart diagram illustrating streaming of video from a head-mounted camera module 100A to the Head mounted display unit 10 according to some embodiments of the invention.

FIG. 7 is a flowchart diagram illustrating streaming of video from an external camera (100B/100C) to the Head mounted display unit 10 according to some embodiments of the invention.

FIGS. 8 and 9 jointly present a flowchart diagram illustrating the activity of the VR-display integrator module, which resides on the Head mounted display module 10 according to some embodiments of the invention.

MODES FOR CARRYING OUT THE INVENTION

Following is a table of definitions of the terms used throughout this application.

| Term | Definition |
| --- | --- |
| Source device | A computerized device that is capable of producing video or audio data streams, and is configured to transmit the said stream to the head mounted display device. Examples for such devices include smartphones, laptops, video cameras, music players, etc. |
| Source display/ Source device display | The visual content displayed on a screen of a source device, for example: the content of a smartphone screen. |
| Non-display visual content | Visual content that is not included |
| Mirroring | The term "mirroring" is used throughout this application in the meaning of streaming a source device's display data onto the virtual reality head mounted display device, to be presented to the user of the said head mounted display device. |
| Video projection/ Projected video | The terms "video projection" and "projected video" are used throughout this application in the meaning of displaying streaming video content originating from a source device within the VR environment, as if it was projected onto a physical 3D surface. |
| Focus/Focus levels | The terms "focus" and "focus levels" are used throughout this application to describe the positioning of a projected video in the VR environment in relation to the user's angle of view. The different levels of focus are: beyond the user's angle of view. within the user's angle of view, but not in the user's line of sight. in the direction of the user's direct line of sight. |

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "source device" as used herein in this application, is defined as a device such as a Smartphone, Tablet, Laptop or Desktop PC, or any wireless device e.g.: security camera, and computing devices residing in virtualized "cloud" environment connected to the same local network of the Head mounted device or via the internet.

The term "media data" as used herein in this application, is defined as any communication or data which can be exchanged between the source device and 3D display environments such as head mounted device, including image, video, text, phone call, signaling data etc.

Figure 1:
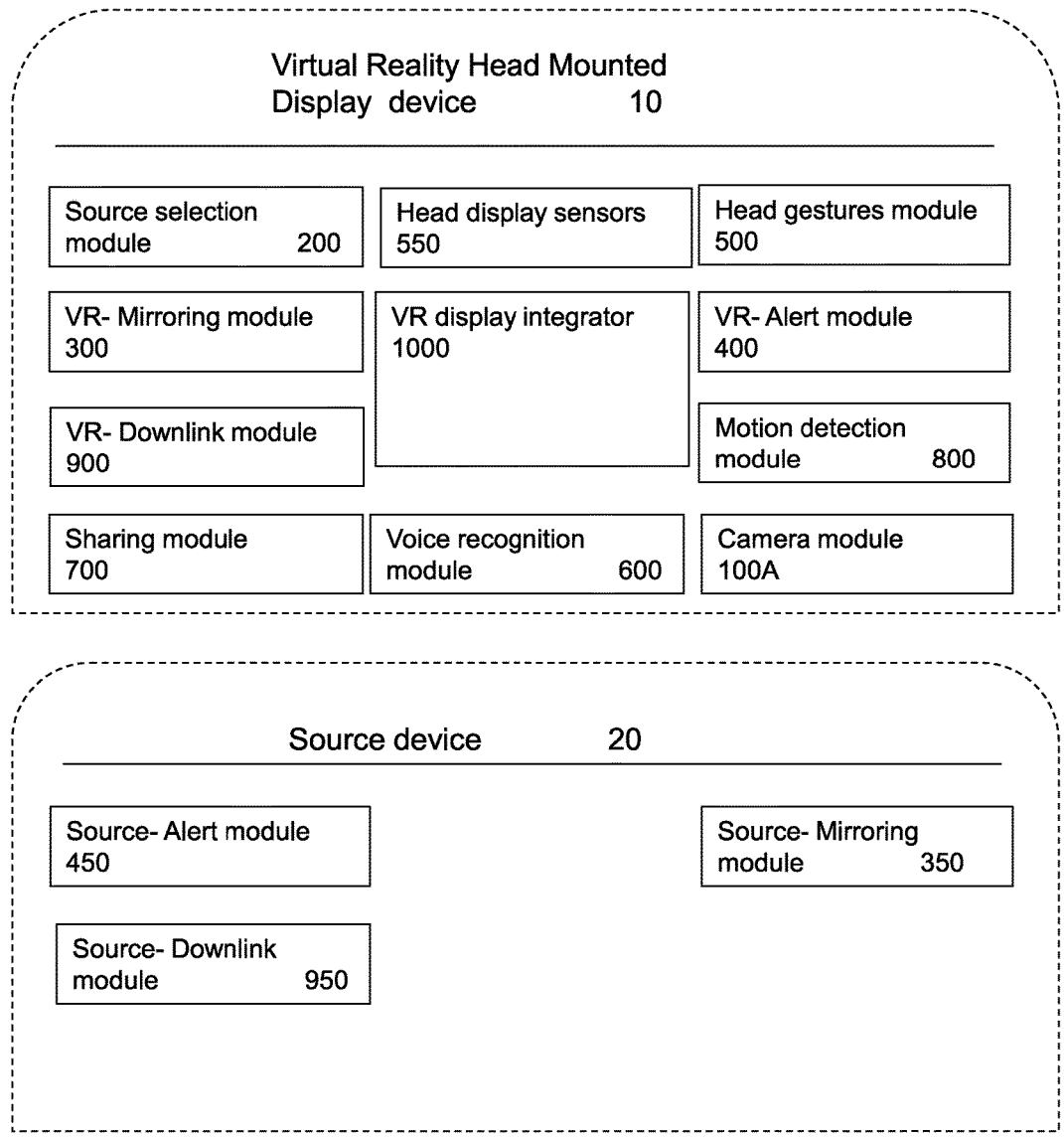
FIG. 1 is a block diagram of a head mounted display device associated with a processing module, a camera installed on the head mounted display device, and a source computer device, according to some embodiments of the invention.

FIG. 1 is a block diagram of a Head mounted display unit 10 associated with a processing module, a camera installed on the head mounted display device 100A, and a source computer device 20, according to some embodiments of the invention.

The Head mounted display unit 10 is designed to process video streams emitted by the head mounted camera module 100A and/or external video sources (100B, 100C).

The Head mounted display unit 10 is associated with a processing device. It is capable of running 3D virtual-reality (VR) applications, thus providing a 3D VR environment for gaming, presentation of augmented reality, facilitating online conference rooms etc. The present invention provides means for incorporating visual 2D and audio media content from multiple source devices 20 within the 3D VR environment.

The Source selection module 200 enables the user to select at least one source device 20 from within the 3D VR environment.

The VR—Mirroring module 300 enables the reception of visual 2D and audio media content from multiple source devices 20 and streaming audio and video from multiple cameras 100A, 100B, 100C).

The VR display integrator module 1000 manages the media content received by the VR-Mirroring module 300, such as to integrate it in a comprehensive 3D VR environment. It is responsible for presenting the media content in relation to the user's location and orientation within the VR environment, and applying required changes in the presentation of media due to user's actions and gestures.

The Head gestures 500 and Motion detection 800 modules enable users to interact with the content presented in the 3D VR environment:

The Head mounted display unit 10 incorporates various sensors 550, such as accelerometers, gyroscopes, compasses etc. These sensors produce information such as the location, orientation, tilt, inclination, motion direction, speed and acceleration of its user.

The Head gestures module 500 interfaces the said sensors 550 and acquires sensor 550 data, enabling the user to:
  Apply actions in the VR environment (e.g. move virtual objects, select menu options, etc.); and
  Apply actions on the source device (e.g. launch applications, send emails, manage phone calls and surf the internet).

Such actions may be performed by gazing at objects within the VR environment, or by producing various, predefined head gestures.

The Motion detection module 800 is designed to identify and extract limb motions and hand gestures from the said video streams. These limb motions and hand gestures can, for example, be used to:
  Apply actions in the VR environment (e.g. move virtual objects, select menu options, etc.)
  Apply actions on the source device (e.g. launch applications, send emails, manage phone calls)
  Analyze real-world computer interface actions, such as typing on a keyboard or clicking a mouse button.

The voice recognition module 600 enables the user of the VR display device 10 to emit verbal instructions that would be applied to projected video streams and objects within the VR environment. The method of applying such verbal instructions is as follows:
  1. A verbal instruction is emitted by the user,
  2. The instruction is analyzed by means of a speech recognition algorithm,
  3. It is recognized as one of a predefined set of verbal instructions, and
  4. It is applied to the objects of the VR environment according to predefined rules.

Examples for such instructions include:
  Moving a virtual object, by saying "go left/right/forward/backward", "follow me", etc.
  Rotating a virtual object, by saying "turn left/right", "face me", etc.
  Changing the properties of a projected video, by saying "bigger", "brighter", "rotate clockwise", etc.
  Moving the virtual object forward or backward and accordingly Zooming in or out from the projection, by enlarging or decreasing the image the 2D projection;

According to some embodiments of the present invention, the voice recognition module 600 enables the user of the VR display device 10 to emit verbal instructions that would be applied on the source device. Examples for such instructions include:
  Answering a phone call, by saying "Answer"
  Sending an email by saying "Dictate email to recipient John Doe", verbally dictating the email, and saying "Send email"

The YR-Alert module 400 enables the user of the VR display device 10 to receive alert messages from one or more source devices, indicating the occurrence of predefined triggering events. The said alert messages may produce visual or audible notifications within the VR environment, and may be acted upon by the user. The user's actions may apply to the VR environment or the source device. For example, the Head mounted display unit 10 may be connected to a source Smartphone device, and may present alert message indicating an incoming call. The user may act upon the incoming call notification within the VR environment, to accept the call on the source Smartphone device.

The sharing module 700 enables users to share information among two or more head mounted display units 10. It facilitates sharing of:
  The display of a specific application, running on at least one source device;
  The display of at least one source device 20;
  The same virtual environment (e.g. participate in a joined conference room); and
  The complete viewpoint of one or more head mounted display units 10.

The sharing module 700 also facilitates sharing, moving and copying of files among two or more source devices.

The VR-Downlink module 900 serves as a communication port, directing messages from the head mounted display unit 10 to one or more source devices 20. The said messages may apply actions on the said source devices. Examples for such messages include:
  Response to alert conditions (e.g. answer phone call);
  Launching or terminating applications;
  Selection of menu items (e.g. changing application configurations); and
  Inject simulated touch, mouse and or keyboard input events at the source device (e.g. move the mouse cursor and cause a click to occur over a specific location on the source device's display based on a hand gesture in the 3D virtual environment).

The source device 20 may be any device capable of producing audio and/or video streams, and propagate such media streams to head mounted display units 10. Examples for such devices include Smartphones, Tablet computers, Laptops and Desktop PCs.

The propagation of audio and/or video streams from the source device 20 to the head mounted display units 10 is done by the Source—Mirroring module 350. According to some embodiments of the present invention, the source device 20 can mirror either the same or different media data to multiple head mounted display units 10 simultaneously.

The Source—Alert module 450 within the source device 20 is responsible for determining the occurrence of pre-defined trigger events, and producing respective alert messages. These alert messages are propagated to the VR—Alert module 400 in the head mounted display units 10. The said alert notifications are displayed within the VR environment, and may be acted upon by the user as described above.

The Source—Downlink module 950 resides within the source device 20, and interacts with the VR—Downlink module 900 on the head mounted display unit 10. It is responsible for obtaining user input from the head mounted display unit 10, and applying respective actions on the source device 20. Consider the following scenario as an example:

The user gazes at a source (e.g. a Smartphone) within the VR environment, thus selecting it among a plurality of mirrored sources;

The user applies a head gesture to launch a specific application on the selected source device;

The application launch command is sent as a message via the VR-Downlink module 900 to the Source-Downlink module 950, within the remote Smartphone source device 20; and The Source-Downlink module 950 launches the selected application on the Smartphone source device 20, as if it had been applied on the source device 20 itself.

Figure 2:
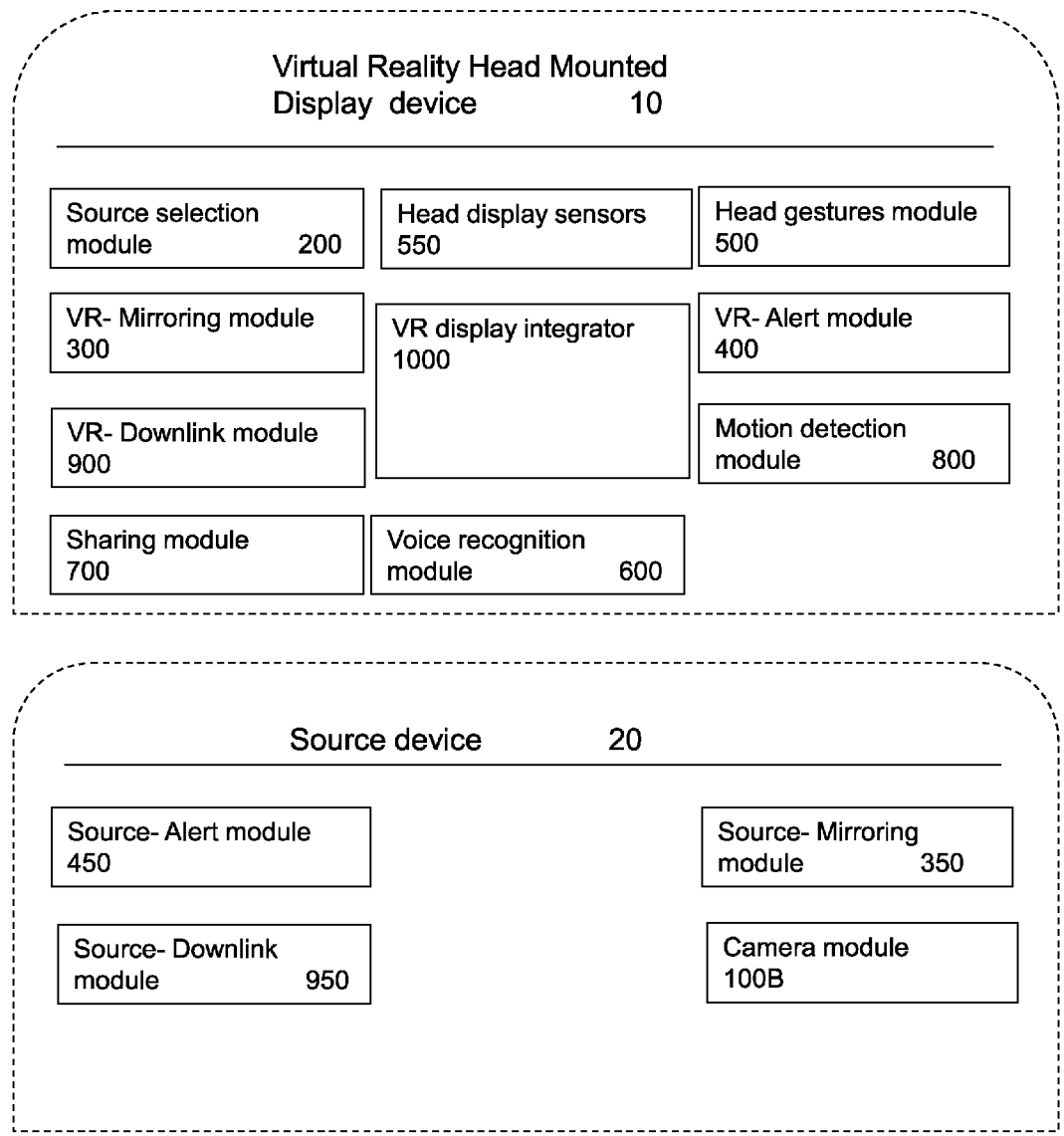
FIG. 2 is a block diagram of a head mounted display device associated with a processing module, a source computer device, and a camera associated with the source device according to some embodiments of the invention.

FIG. 2 is a block diagram of a head mounted display device associated with a processing module, a source computer device, and a camera associated with the source device according to some embodiments of the invention. FIG. 2 differs from FIG. 1 solely on the location of the Camera device, according to different embodiments of the invention; In FIG. 1, the camera 100A is integrated within the head mounted display device 10, whereas in FIG. 2 the camera is associated with the source device. This difference implies the following:

The camera video output is streamed to the head mounted display device 10 by the Source-mirroring module 350.

Motion detection scenarios differ according to the source of video. See examples for "Streaming video and Head gestures" scenarios below.

Figure 3:
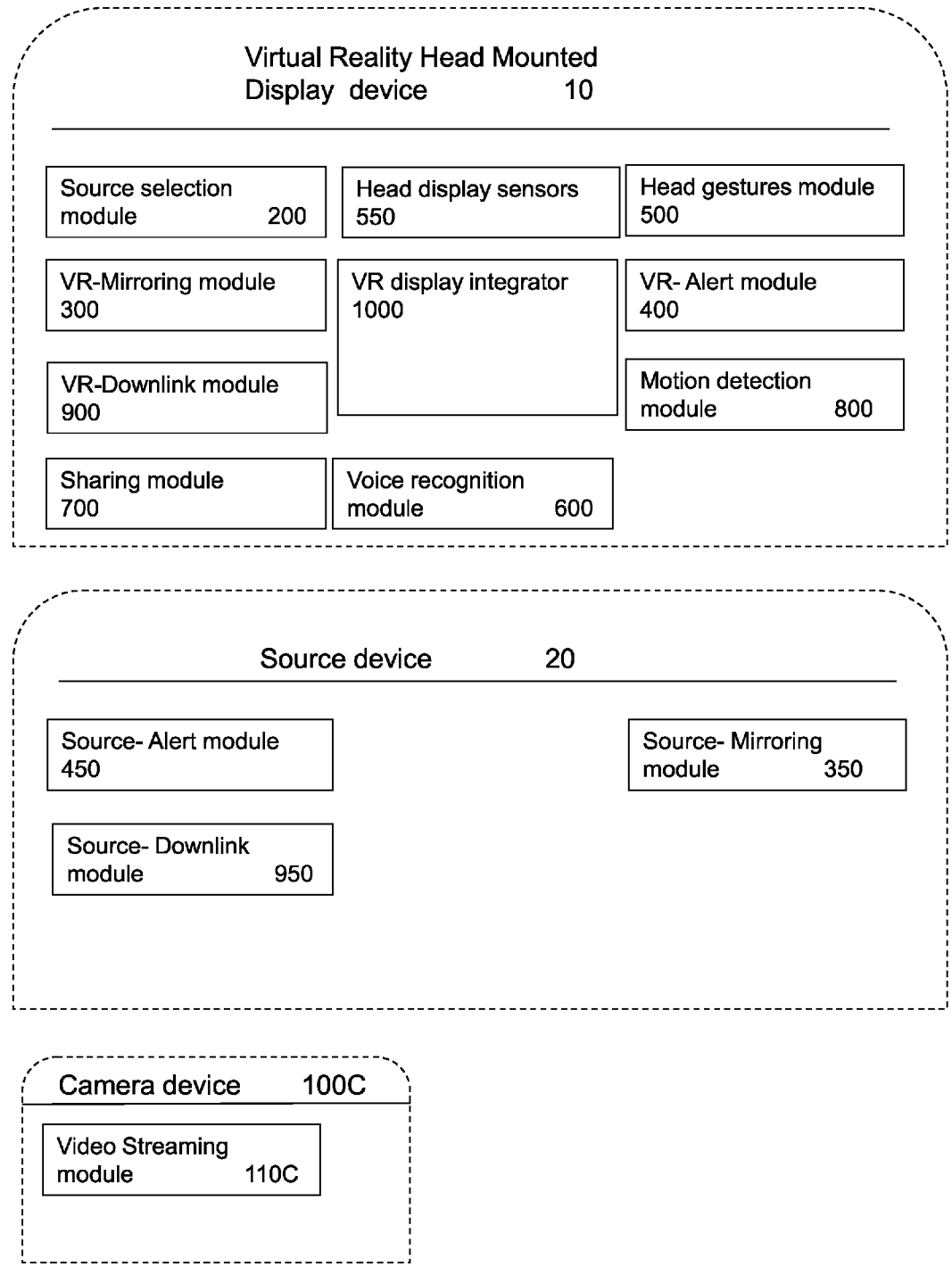
FIG. 3 is a block diagram of a head mounted display device associated with a processing module, a source computer device, and an independent camera according to some embodiments of the invention.

FIG. 3 is a block diagram of a head mounted display device associated with a processing module, a source computer device, a keyboard interface and an independent camera. FIG. 3 differs from FIG. 1 solely on the location of the Camera device, according to different embodiments of the invention. In FIG. 1 the camera 100A is integrated within the head mounted display device 10, whereas in FIG. 3 the camera is independent. This difference implies the following:

The camera video output is streamed to the head mounted display device 10 by the Video-streaming module 110C.

Motion detection scenarios differ according to the source of video. See examples for "Streaming video and Head gestures" scenarios below.

Figure 4:
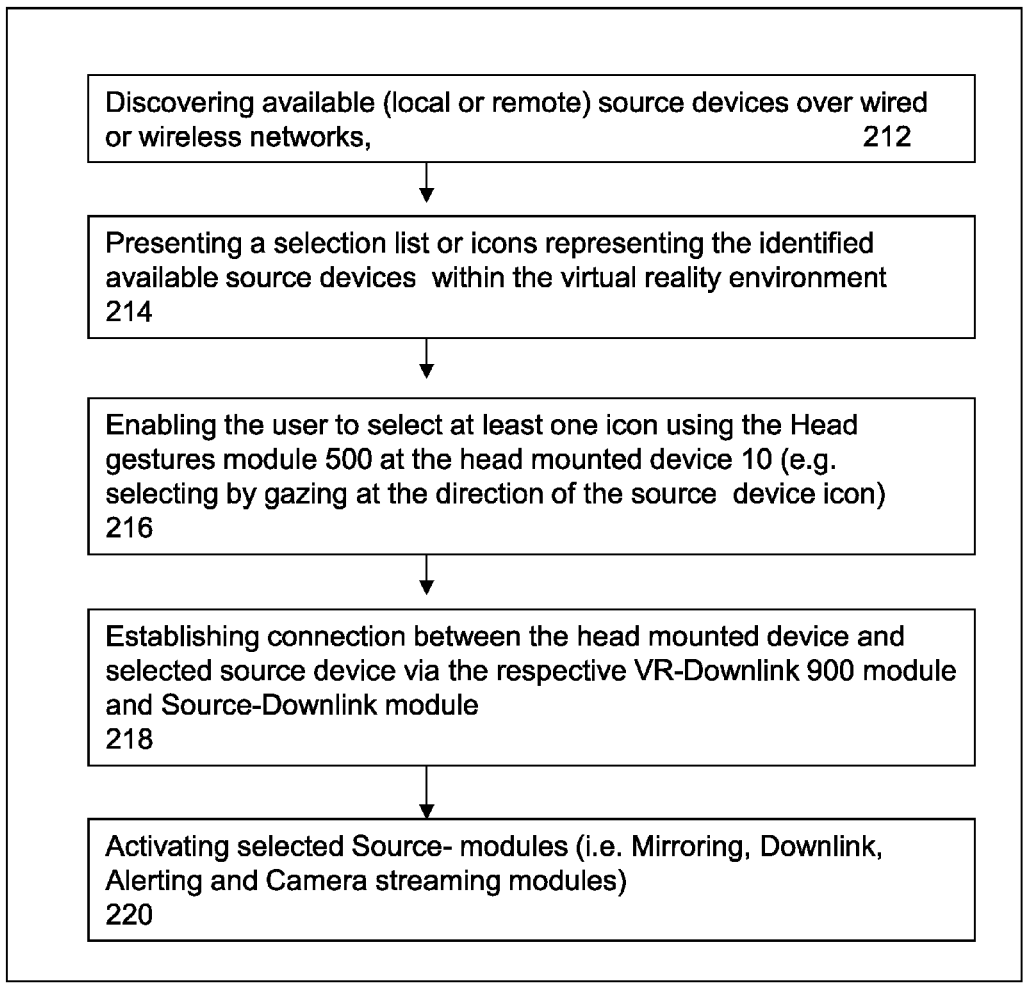
FIG. 4 is a flowchart diagram illustrating the function of the Source selection module which resides on the Head mounted display unit, according to some embodiments of the invention.

FIG. 4 is a flowchart diagram illustrating the function of the Source selection module 200 which resides on the Head mounted display unit 10, according to some embodiments of the invention. The Source selection module 200 performs at least one of the following steps:

Discovering available local or remote source devices over wired or wireless networks, e.g. local or wide-area networks (LAN or WAN), or cellular networks;

Presenting a UI selection list or icons in 3D format representing the identified available source devices within the virtual reality environment (step 214);

Enabling the user to select at least one icon using the Head gestures module 500 at the head mounted device 10 (e.g. selecting by gazing at the direction of the source device icon) (step 216);

Establishing connection between the head mounted device and selected source device via the respective VR-Downlink module 900 and Source-Downlink module 950 (step 218); and/or Activating selected source modules (i.e. Mirroring, Downlink, Alerting and Camera streaming modules (step 220).

These source devices may be connected to the networks through wired or wireless (e.g. Wi-Fi, Bluetooth, cellular) communication, (step 212). Said discovery process may be achieved by various methods. For example:

The VR display device 10 may initiate the discovery process by emitting a local network, wired or wireless broadcast transmission. Source devices may respond to the said broadcast transmission, and thus be added to a list of discovered source devices;

The VR display device 10 may initiate network services to discover source devices 20 over a local or wide area network;

The VR display device 10 may initiate a cellular data communication with a predefined list of cellular source devices (e.g.: Smartphones); and/or Source devices 20 may initiate communication with the VR display device 10, and signal their availability.

Figure 5:
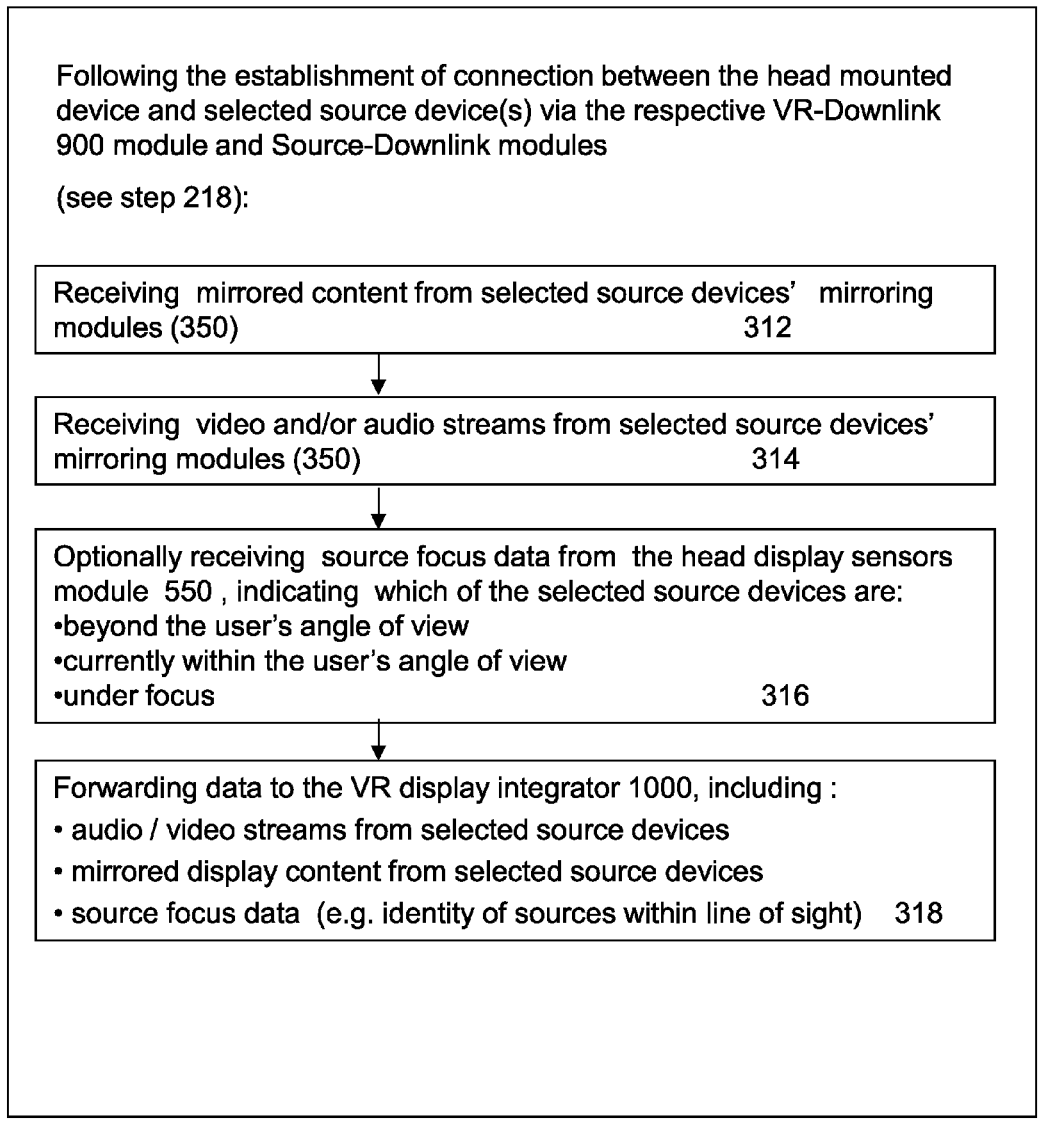
FIG. 5 is a flowchart diagram illustrating the activity of the VR-Mirroring module 500, which resides on the Head mounted display unit 10 according to some embodiments of the invention.

FIG. 5 is a flowchart diagram illustrating the activity of the VR-Mirroring module 300, which resides on the Head mounted display unit 10 according to some embodiments of the invention.

Following the establishment of connection between the head mounted device and selected source device(s) via the respective VR-Downlink 900 module and Source-Downlink module 950 (see above), the VR-Mirroring module 300 performs at least one of the following steps:

It receives mirrored content from selected source devices' mirroring modules 350 (step 312);

It receives video and/or audio media content streams from selected source devices mirroring modules (350) (step 314);

The VR-Mirroring module 300 optionally receives source focus data from the head display sensors module 550 (step 316), indicating which of the selected source devices are:
  beyond the user's angle of view,
  currently within the user's angle of view, or
  under focus (e.g.: in the direction of the user's line of sight, or following prolonged gazing at the source); and/or The VR-Mirroring module 300 propagates the said data to the VR display integrator 1000 (step 318), including:
  audio/video streams from selected source devices;
  mirrored display content from selected source devices; and
  source focus data (e.g. identity of source devices in line of sight).

FIG. 6 is a flowchart diagram illustrating streaming of video from a head-mounted camera module 100A to the Head mounted display unit 10 according to some embodiments of the invention.

The head mounted display unit 10 may optionally be constantly receiving a video stream from the head-mounted camera module 100A (step 112A).

The Head gestures module (500) identifies and monitors user head movements and gestures within the 3D VR environment (e.g. gazing toward a predefined direction) (step 114A).

In case such a predefined gesture as gazing towards a certain direction is identified, the head mounted display unit 10 will perform at least one of the following steps (step 116A):
  Stream the video from the head-mounted video camera 100A to the head mounted virtual reality display unit 10,
  Send a message to the source device 20 via the VR-Downlink module 900, to enable media content and mirrored display to stream from the source device 20 to the head-mounted display unit 10, and/or
  Enable streaming video and source mirrored display data to be displayed within the virtual reality environment.

According to some embodiments, the head mounted display unit 10 continuously displays the streaming video as long as the user is gazing at the predefined location. When the user shifts his viewpoint, thus ceasing his gaze at the predefined location, the streaming of video (and its display in the VR environment) is stopped (step 118A).

FIG. 7 is a flowchart diagram illustrating streaming of video from an external camera (100B/100C) to the Head mounted display unit 10 according to some embodiments of the invention.

The head mounted display unit 10 may optionally be constantly receiving a stream of video from an external camera device (100B/100C), (step 112B).

According to some embodiments of the present invention, the said camera streaming video stream may be presented in the VR environment. (step 114B).

The head mounted display unit 10 identifies user gestures either by (step 116B):
  Movement direction within the 3D VR environment,
  Head gestures, via the Head gestures module (500), or
  Hand gestures via the Motion detection module (800).

The head mounted display unit 10 may optionally react to the said identified user's gestures. Examples for such reactions include (step 118B):
  Activating the external camera's video streaming (350 or 110C), to receive streaming video from external cameras (100B, 100C respectively);
  Employing the VR display integrator (1000) to present the said streaming video within the virtual reality environment (step 118B);
  Moving the display of video within the VR environment (e.g. as a response to a hand gesture), the moving may include rotating, tiling, moving forward or backward by zooming in or out;
  Changing properties of the displayed video (e.g. present the video in high resolution when the user is gazing toward the video object in the VR environment); and
  Seizing the presentation of video within the VR environment (e.g. when the presented video is beyond the user's angle of view in the VR environment).

Figure 8:
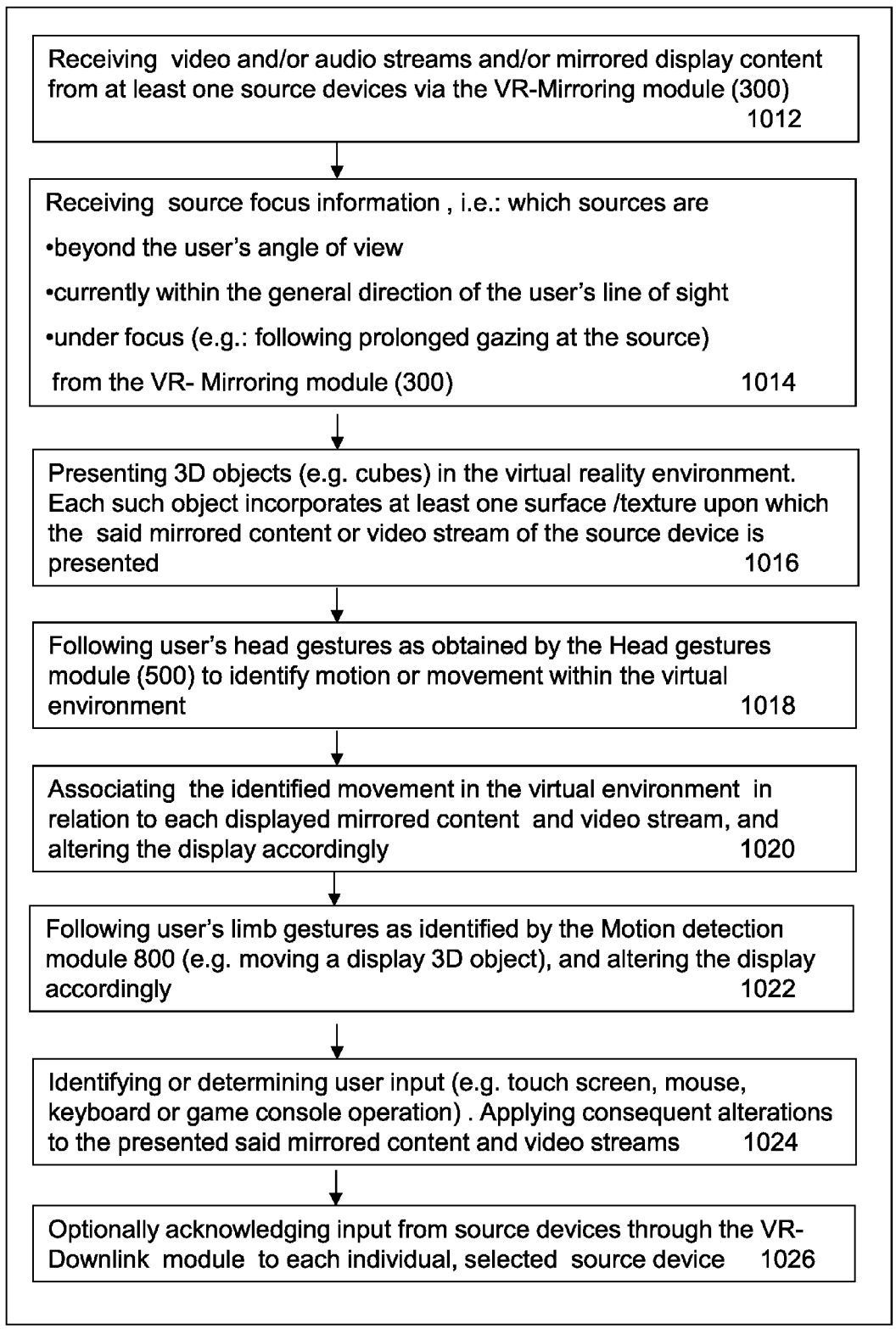

FIGS. 8 and 9 jointly present a flowchart diagram illustrating the activity of the VR-display integrator module 1000, which resides on the Head mounted display unit 10 according to some embodiments of the invention. The VR-display integrator module 1000 integrates multiple media input streams and mirrored source device displays, to form and present a comprehensive 3D VR environment.

The VR-display integrator module 1000 receives video and/or audio streams and/or mirrored display content from at least one source devices via the VR-Mirroring module (300) (step 1012).

The VR-display integrator module 1000 receives source focus information (step 1014), i.e., which sources are:
  beyond the user's angle of view;
  currently within the user's angle of view; and
  under focus (e.g.: within the user's line of sight, or following prolonged, direct gazing at the source device).

The VR-display integrator module 1000 presents 3D objects (e.g. cubes) in the virtual reality environment. Each such object incorporates at least one 2-D or 3-D surface and\or texture, upon which a selected source device's display or video stream is projected (step 1016).

According to one embodiment, the VR surface upon which the mirrored device's display image is projected can have the general form of a 3D surface, (e.g. a surface of any 3D abstract geometric shape or polygon), and is not limited to any flat plane in a 3D space. For example, the said VR surface may have the form of a curved object, such as a cylinder.

The VR-display integrator module 1000 follows the user's head gestures as obtained by the Head gestures module (500) to identify motion or movement within the 3D VR environment (step 1018).

The VR-display integrator module 1000 associates the identified movement in the virtual environment in relation to each displayed 3D surface as well as to each mirrored display content and video stream, and alters the displayed VR viewpoint accordingly (step 1020).

The integrator module identifies when a user move or tilts his/her head at any direction, as result the VR display of 3D surfaces of a 3D object as well as the projected mirrored display content or projected video streams will be moved or altered as if the projected video has moved, rotated or tilted with the surface of the 3D object. The projection of the mirrored display content or projected video streams is synchronized with the movement of the of the 3D surface of the 3D object.

For example:
  When a user tilts his/her head forward or backward, the VR display of 3D surfaces as well as the projected mirrored display content and projected video streams will be altered as if the objects are drawn nearer or further away, creating zooming in or out effect respectively.
  When a user tilts his/her head laterally, the VR display of 3D surfaces as well as the projected mirrored display content, and projected video streams will be altered as if the objects are viewed in a respective lateral angle.

The VR-display integrator module 1000 follows user's limb gestures as identified by the Motion detection module 800 (e.g. moving a display 3D object), and alters the display accordingly (step 1022). For example, the VR-display integrator module 1000 may change the location, size or brightness or clarity of presented objects within the VR environment, according to predefined hand gestures.

According to some embodiments of the present invention the integrator module may receive non-display visual content as streaming video data from a source device and displaying the said non-display visual content within the VR environment, as a 2-D projection over a second virtual 3-D surface.

According to some embodiments of the present invention receiving non-display visual content as streaming video data from a second source device; and displaying the said non-display visual content within the VR environment, as a 2-D projection over a second virtual 3-D surface.

According to some embodiments of the present invention, the VR-display integrator module 1000 identifies user input (e.g. touch screen, mouse, keyboard or game console operation) on the source device, and applies consequent alterations to the presented said mirrored content and video streams (step 1024).

According to some embodiments of the present invention, the VR-display integrator module 1000 may acknowledge the reception of such user input applied to a source device (e.g. mouse click) through the VR-Downlink module, to each of the selected source devices (step 1026).

According to some embodiments of the present invention, the VR-display integrator module 1000 relates to the source focus information, thus achieving a dual benefit:

1. The VR-display integrator module 1000 better simulates the effect of a real-life field of view in the VR environment, and
2. The head mounted display device 10 will require less data from source devices that are not within the user's direct line of sight, resulting in conservation of bandwidth in the streaming of mirrored video content (step 1028).

According to a preferred embodiment, the VR-display integrator module 1000 relates to the source focus information as follows:

Upon detection of a source device beyond the user's angle of view, the VR-display integrator module 1000 will stop the mirroring of content from the said device to the head mounted device, and the display thereof.

Upon detection of multiple source devices within the user's angle of view, the VR-display integrator module 1000 will mirror the content of the said source devices to the head mounted device, and display the mirrored content with moderate resolution; the moderate resolution is adapted to the location of the source device in the line of sight of the user, based on the distance of the device from center of line of sight, the object will appear less focused, with moderated resolution in relation to said distance.

Upon detection of the source device under focus (e.g. in direct line of sight), the VR-display integrator module 1000 will mirror the content of the said source device under focus to the head mounted device, and displaying the content of the said device in high resolution (higher than other source device detected within the user's angle of view).

According to some embodiments of the present invention, The VR-display integrator module 1000 identifies markers in the real world (e.g. bar codes, QR codes) on video streams originating from source devices 20 or head-mounted cameras 100A. Following such recognition, predefined virtual items would be displayed in the 3D VR environment. For example, a specific QR code located on the user's desk may cause a virtual keyboard to be presented in the 3D VR environment, in the respective location (step 1030).

The VR-display integrator module 1000 integrates the altered video streams and mirrored content from all selected devices to a comprehensive 3D VR display (step 1032).

The VR-display integrator module 1000 obtains alerts that have been received by the VR-Alert module (400), and incorporates them in the 3D VR display (step 1034).

Figure 10:
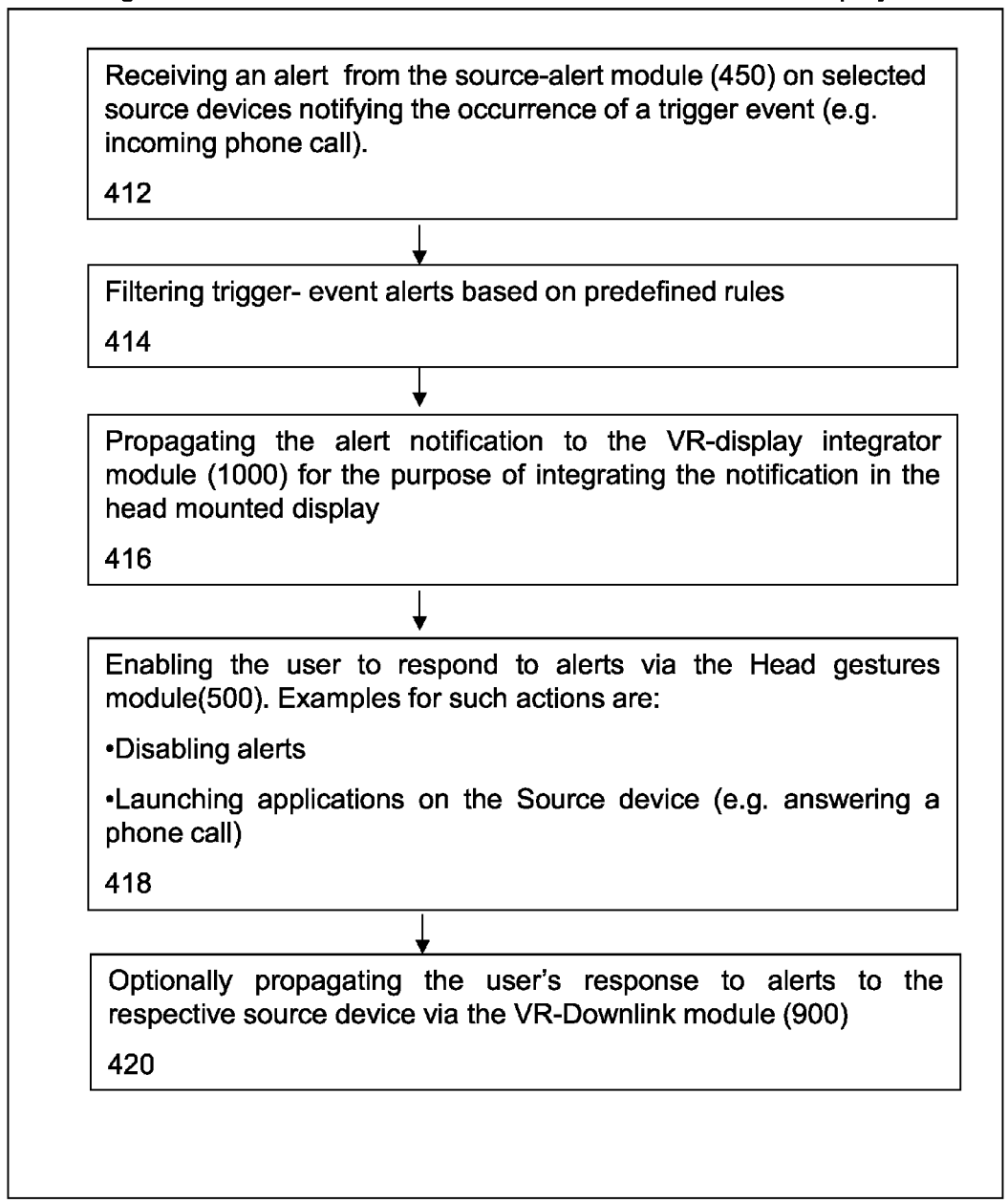
FIG. 10 is a flowchart diagram illustrating the YR-Alert module 400. This module resides on the Head mounted display unit 10, and handles alert messages sent from source devices to the head mounted display unit, according to some embodiments of the invention.

FIG. 10 is a flowchart diagram illustrating the VR-Alert module 400. This module resides on the Head mounted display unit 10, and handles alert messages sent from source devices to the head mounted display unit, according to some embodiments of the invention. The YR-Alert module 400 performs at least one of the following steps:

Receiving an alert from the source-alert module (450) residing on selected source devices 20, notifying the occurrence of a trigger event (e.g. incoming phone call), (step 412);

Filtering event triggers based on user pre-defined rules (e.g. do not pop-up alert notifications during a game) (step 414);

Propagating the alert notification to the VR-display integrator module (1000) for the purpose of integrating the notification in the head mounted display (step 416); and/or Enabling the user to respond to alerts via the GUI-control module (500) (step 418). Examples for such actions are:
  Disabling alerts; and
  Launching applications on the Source device (e.g. answering a phone call).

According to some embodiments of the invention, the YR-Alert module 400 may propagate the user's response to alerts to the respective source device via the VR-Downlink module (900) (step 420).

Figure 11:
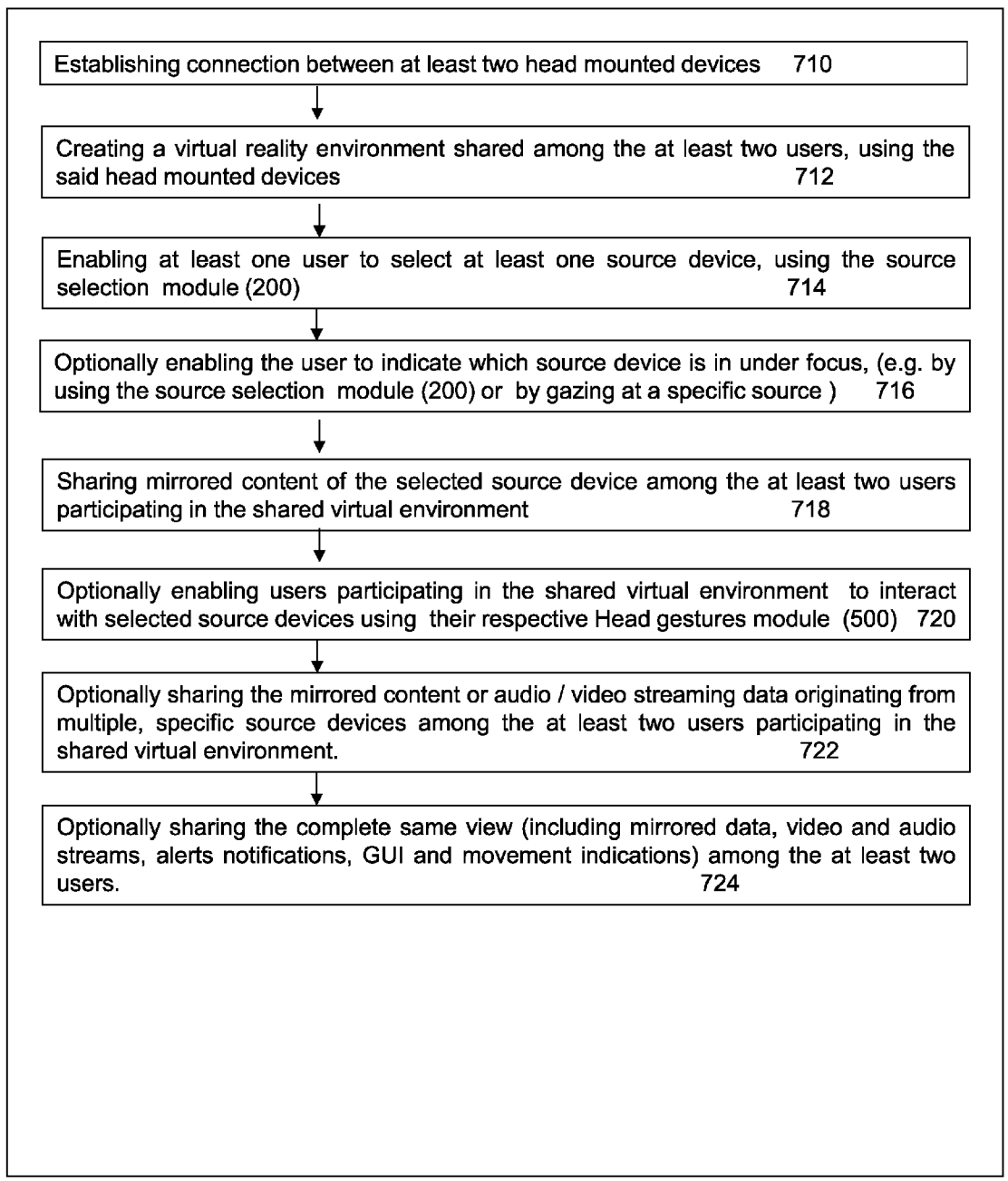
FIG. 11 is a flowchart diagram illustrating the Sharing module 700. This module resides on the Head mounted display unit 10, and enables sharing of information by two or more head-mounted display units, according to some embodiments of the invention.

FIG. 11 is a flowchart diagram illustrating the action of the Sharing module 700 according to some embodiments of the invention. The Sharing module 700 facilitates the sharing of information by two or more head-mounted display units 10, and performs at least one of the following steps:

The Sharing module 700 establishes a connection between at least two head mounted devices 10 (step 710);

It creates a virtual reality environment, shared among the at least two connected users, such as conference room (step 712); and/or The Sharing module 700 enables at least one user to select a source device using the source selection module (step 714).

According to some embodiments of the invention, the Sharing module 700 enables the user to indicate which source device is in under focus, (e.g. by using the source selection module (200) or by gazing at a specific source) (step 716).

The Sharing module 700 shares the mirrored content of the selected source device in the shared virtual environment (step 718), and enables all participating users to interact with the selected source device using their respective Head gestures module 500 (step 720).

According to some embodiments of the invention, the Sharing module 700 shares the mirrored content or audio/video streaming data originating from multiple, specific source devices among the at least two users participating in the shared virtual environment. For example, consider an environment consisting of two users of head-mounted display units 10; U1 and U2, and five source devices; S1 thru S5. User U1 is configured to receive mirrored content from sources S1, S2, S3, and user U2 is configured to receive mirrored content from sources S3, S4 and S5. This option will enable user U2 to receive and present content from source S1 within his/her 3D VR environment, through the connection between users U1 and U2 (step 722).

According to some embodiments of the invention, the Sharing module 700 shares the complete same view (including mirrored data, video and audio streams, alerts notifications, Head gestures and movement indications) among the at least two connected users (step 724). Pertaining to the example given above, user U1 may share his/her virtual environment and enable user U2 to view the same 3D VR scenery as U1.

Figure 12:
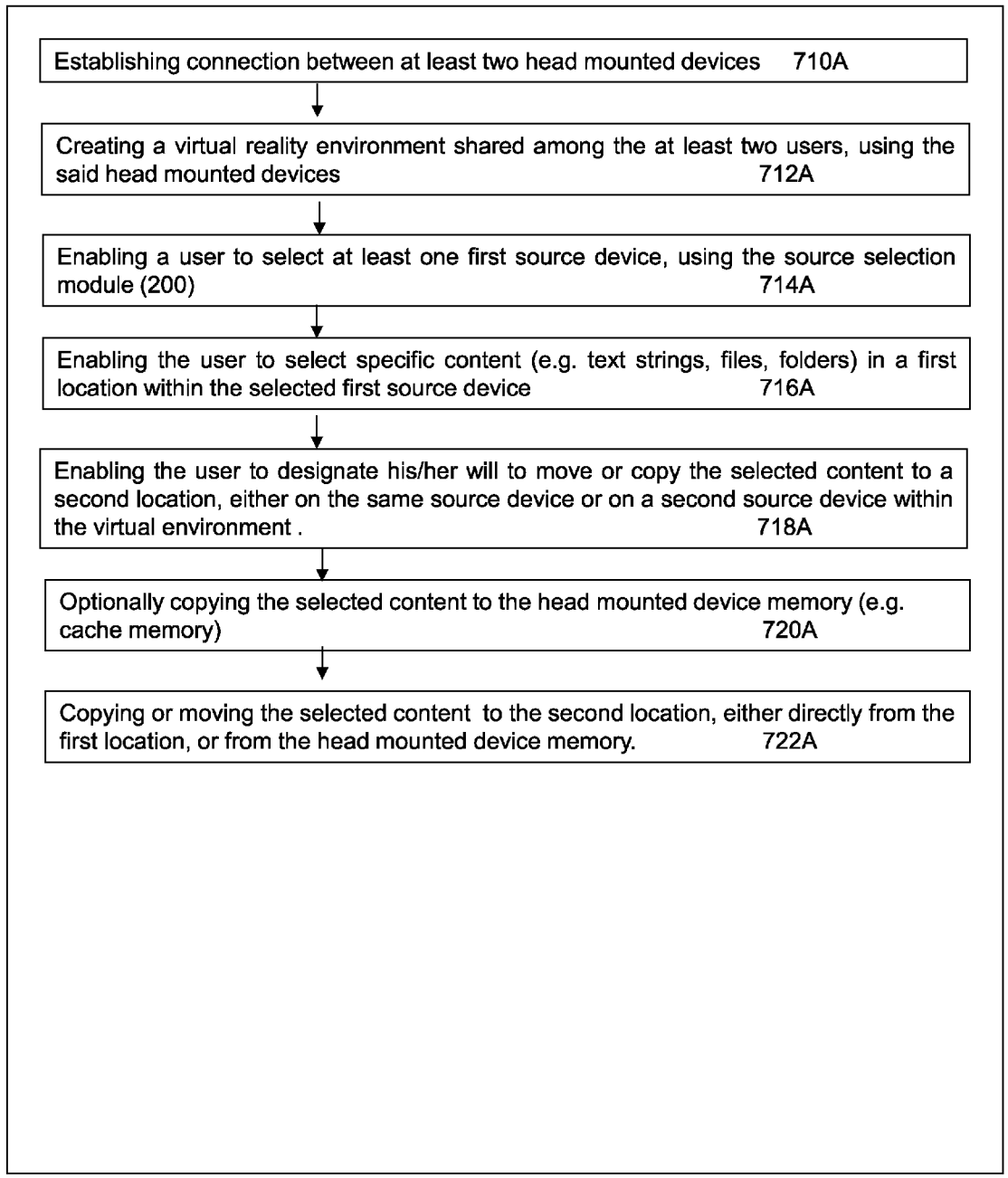
FIG. 12 is a flowchart diagram illustrating the action of moving and copying data between source devices via the sharing module 700

FIG. 12 is a flowchart diagram illustrating the action of moving and copying data between source devices via the sharing module 700.

The Sharing module 700 optionally establishes a connection between at least two head mounted devices 10 (step 710A) and creates a virtual reality environment, shared among the at least two connected users, such as conference room (step 712A).

The Sharing module 700 enables at least one user to select a source device using the source selection module (step 714A).

The Sharing module 700 enables the user to select specific content (e.g. text strings, files, folders), on one location on the selected source device (step 716A).

According to a preferred embodiment, the said selection of content may be implemented by identifying head gestures and/or limb movements by the Head gestures module 500 or Motion detection module 800 respectively.

The Sharing module 700 enables the user to indicate his/her will to move or copy the selected content to a second location (e.g. by drag-and-dropping, cut-and-pasting or copy-and-pasting it), either on the same source device or on a second source device within the virtual environment. (Step 718A). According to one preferred embodiment, the said indication of the user's intention to move or copy the said content may be acquired by identifying head gestures and/or limb movements by the head gestures module 500 and/or motion detection module 800 respectively.

The Sharing module 700 optionally copies the selected content to the head mounted device memory (e.g. cache memory) (step 720A).

The Sharing module 700 copies or moves the selected content to the second location, either directly from the first location, or from the head mounted device memory (e.g. cache memory) (step 722A).

Figure 13:
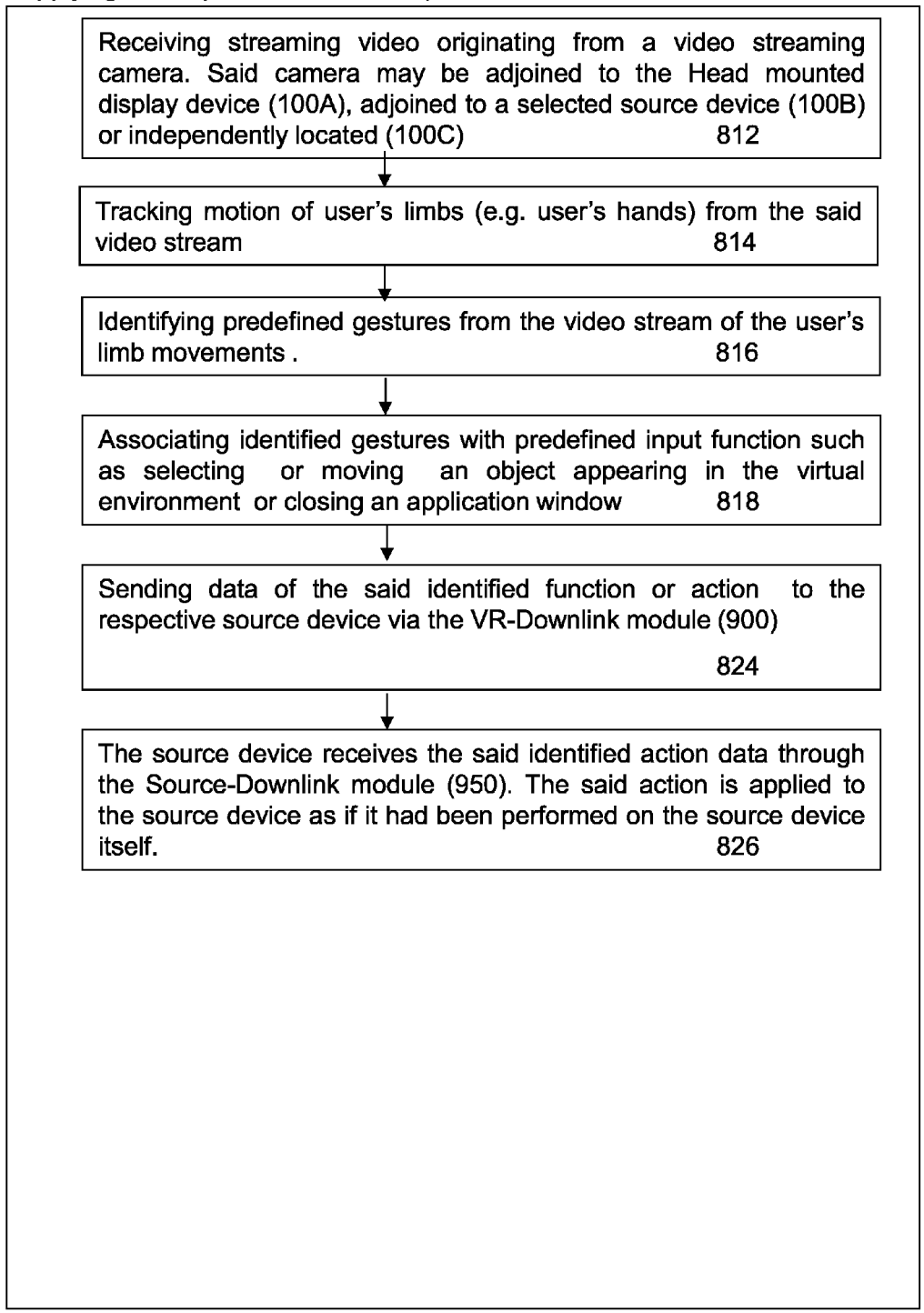
FIG. 13 is a flowchart diagram illustrating the Motion detection module 800. This module resides on the Head mounted display unit 10, and Identifies user's motions and gestures through a camera video stream, according to some embodiments of the invention.

FIG. 13 is a flowchart diagram illustrating the action of the Motion detection module 800 according to some embodiments of the invention.

The Motion detection module 800 is responsible for identifying user's motions and gestures through a camera video stream, and applying consequent actions on respective source devices. The Motion detection module 800 performs at least one of the following steps:

The Motion detection module 800 receives streaming video originating from a video streaming camera. Said camera may be adjoined to the Head mounted display device (100A), adjoined to a selected source device (100B) or independently located (100C) (step 812);

It tracks the motion of user's limbs (e.g. user's hands) from the said video stream (step 814), and identifies predefined gestures from the video stream of the user's limb movements (step 816);

The Motion detection module 800 associates said identified gestures with predefined actions such as: selecting or moving an object appearing in the 3D VR environment, closing an application window or answering a phone call (step 818); and/or The Motion detection module 800 sends data pertaining to the identified action to the respective selected source device via the VR-Downlink module 900 (step 824). The source device 20 receives the identified action data through the Source-Downlink module 950. The said action (e.g. closing an application window) is applied to the source device 20 as if it had been performed on the source device itself (step 826).

Figure 14:
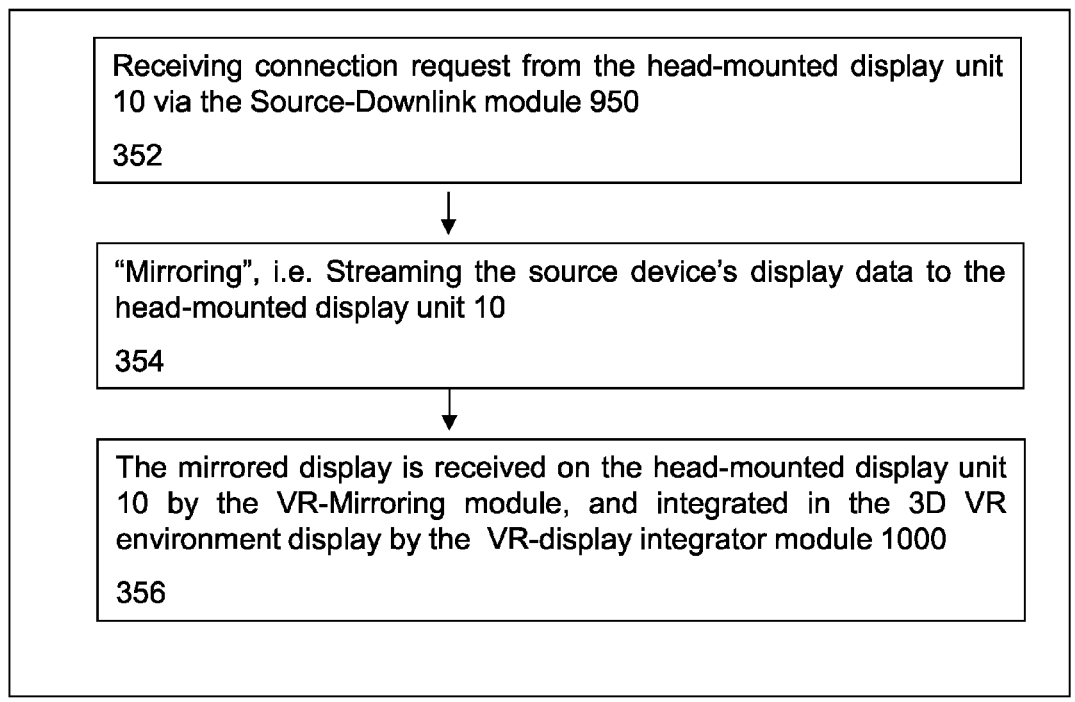
FIG. 14 is a flowchart diagram illustrating the Source-mirroring module 350. This module resides within the source device 20, and is responsible for mirroring the source device's display towards the Head mounted display unit 10 according to some embodiments of the invention.

FIG. 14 is a flowchart diagram illustrating the Source-mirroring module 350 according to some embodiments of the invention. This module resides within the source device 20, and is responsible for mirroring the source device's display towards the Head mounted display unit 10. The Source-mirroring module 350 performs at least one of the following steps:

It receives a connection request from the head-mounted display unit 10 via the Source-Downlink module 950 (step 352);

It Mirrors (i.e. Streams) the source device's display content to the head-mounted display unit 10 (step 354); and/or The mirrored display is received on the head-mounted display unit 10 by the VR-Mirroring module, and integrated in the 3D VR environment display by the VR-display integrator module 1000 (step 356).

Figure 15:
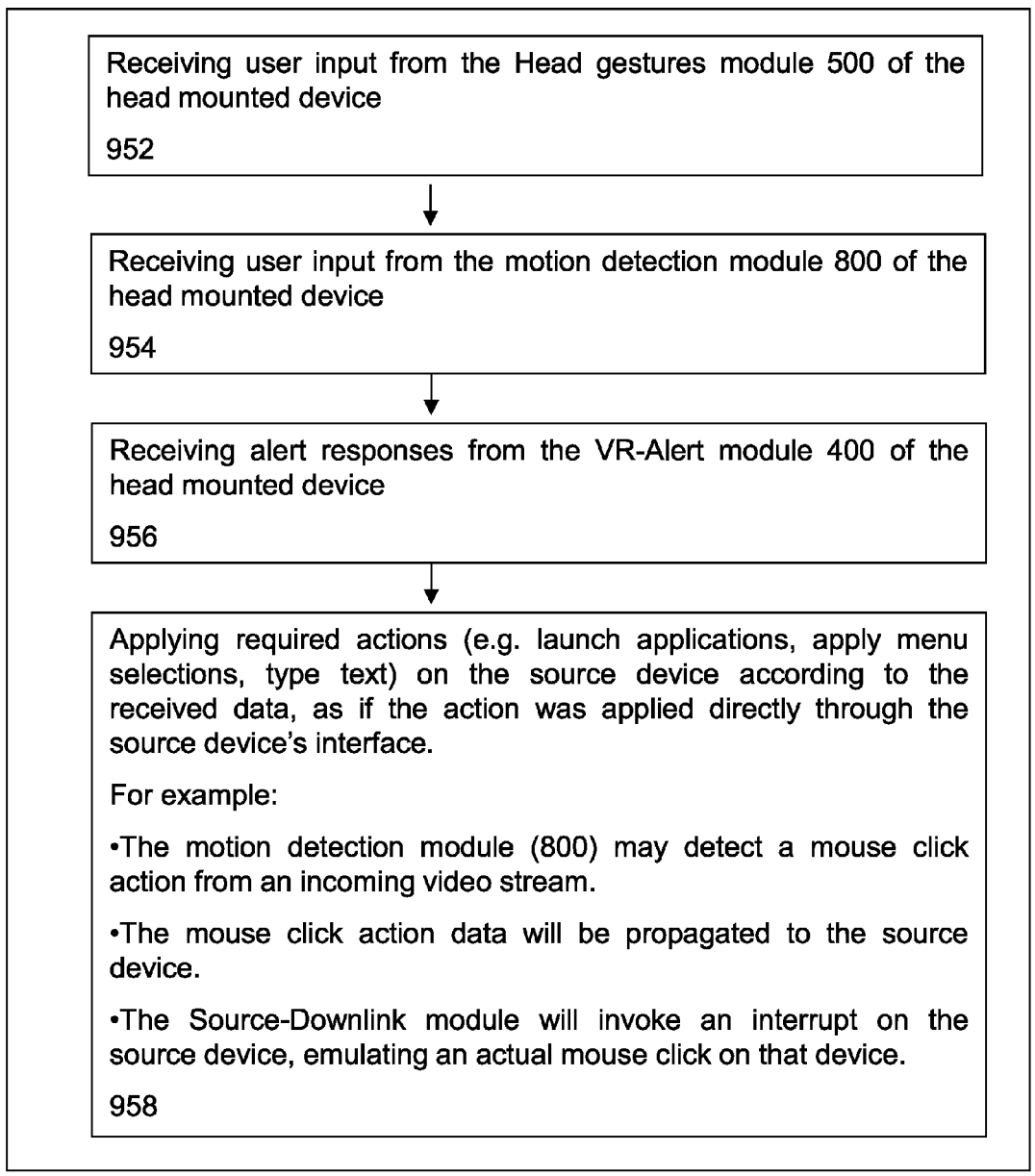
FIG. 15 is a flowchart diagram illustrating the activity of the Source-Downlink module 950. This module resides within the source device 20, and is responsible for receiving data from the Head mounted display unit 10, and optionally applying respective actions on the source device, according to some embodiments of the invention.

FIG. 15 is a flowchart diagram illustrating the activity of the Source-Downlink module 950, according to some embodiments of the invention. This module resides within the source device 20, and is responsible for receiving data from the Head mounted display unit 10, and optionally applying respective actions on the source device.

The Source-Downlink module 950 performs at least one of the following steps:

It receives user input from the Head gestures module 500 of the head mounted device (step 952);

It receives user input from the motion detection module 800 of the head mounted device (step 954);

The Source-Downlink module 950 receives alert responses from the VR-Alert module 400 of the head mounted device (step 956); and/or It applies required actions (e.g. launches applications, applies menu selections, types text) on the source device according to the received data, as if the action was applied directly through the source device's interface (step 958). For example:

The Head gestures module 500 may detect a predefined head gesture towards a specific application's icon on a selected source's projected display in the VR environment.

The said head gesture will be propagated as a message to the Source-Downlink module 950 on the source device 20.

The Source-Downlink module 950 will invoke an interrupt on the source device, emulating an actual mouse click on that device.

The head gesture message will be treated on the source device as if it was a mouse click interrupt, resulting in the launch of the application on the actual source device 20.

Figure 16:
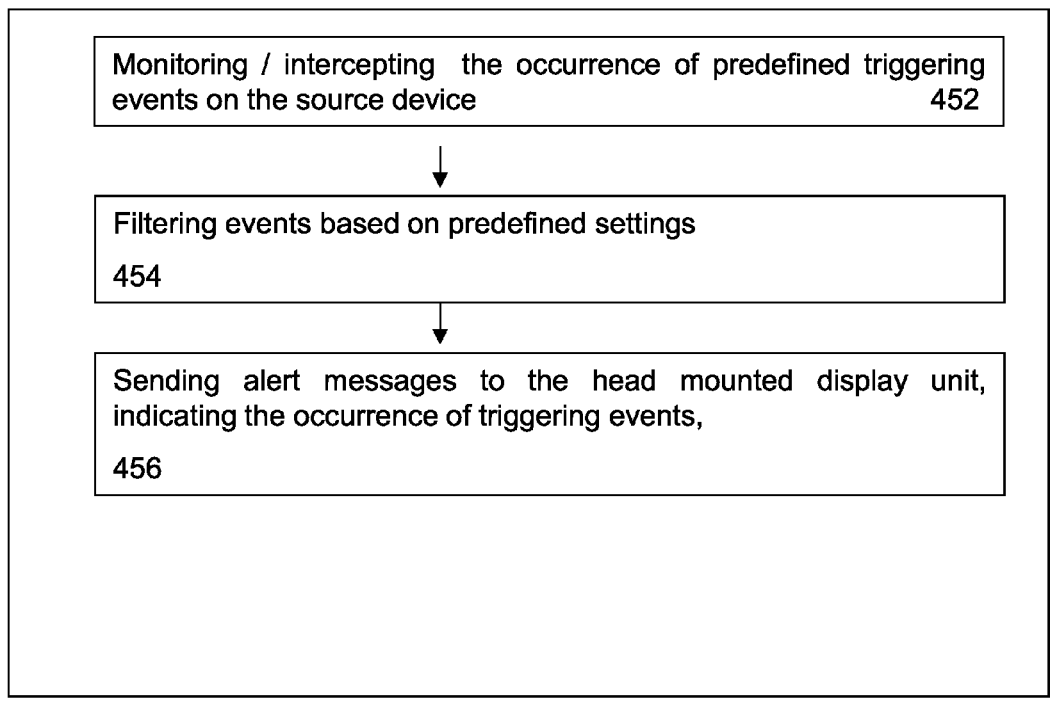
FIG. 16 is a flowchart diagram illustrating the activity of the Source Alert module 600. This module resides within the source device 20, and is responsible for sending alerts regarding source device events to the Head mounted display unit 10.

FIG. 16 is a flowchart diagram illustrating the Source-Alert module 450 according to some embodiments of the invention. The Source-Alert module 450 is responsible for Sending alerts regarding source device events to the Head mounted display unit 10.

The Source-Alert module 450 performs at least one of the following steps:

It monitors and identifies the occurrence of predefined triggering events on the source device (e.g. incoming email or text message) (step 452);

It filters alerts according to predefined settings (e.g. do not interrupt a VR conference room meeting (step 454); and/or It sends alert messages to the head mounted display unit 10, indicating the occurrence of said triggering events (step 456).

The alert messages are handled by the YR-Alerts 400 module the head mounted display unit 10 as described above.

Figure 17:
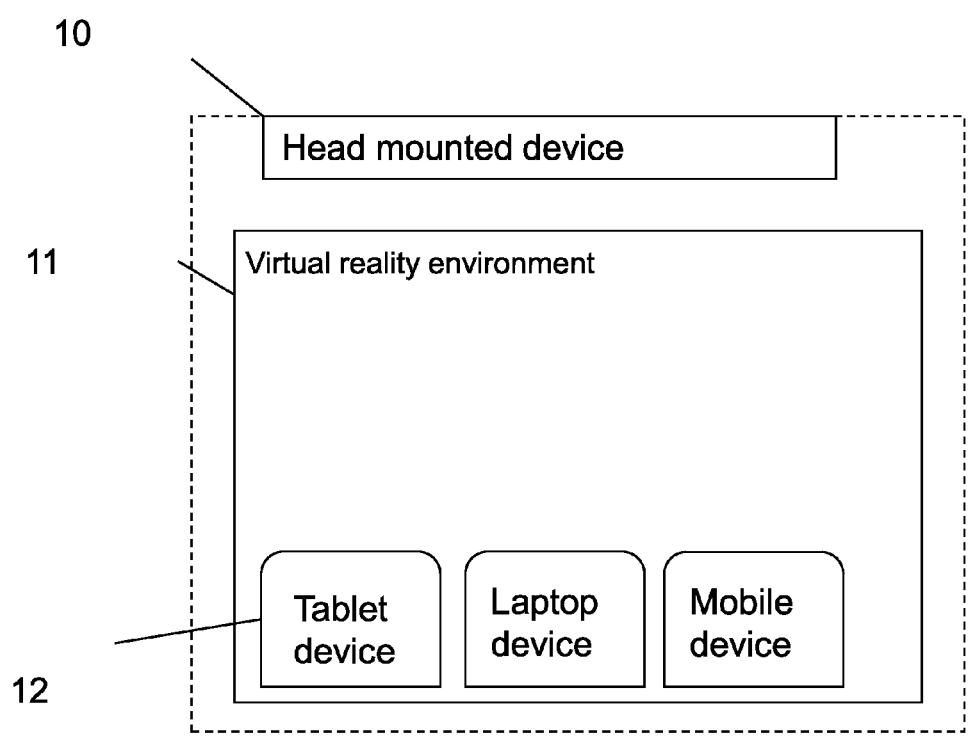
FIG. 17 is a diagram illustrating an example of the source icons display on a Head mounted display unit 10, according to some embodiments of the invention.

FIG. 17 is a diagram illustrating an example of the source icons display on a Head mounted display unit 10, according to some embodiments of the invention.

Figure 18A:
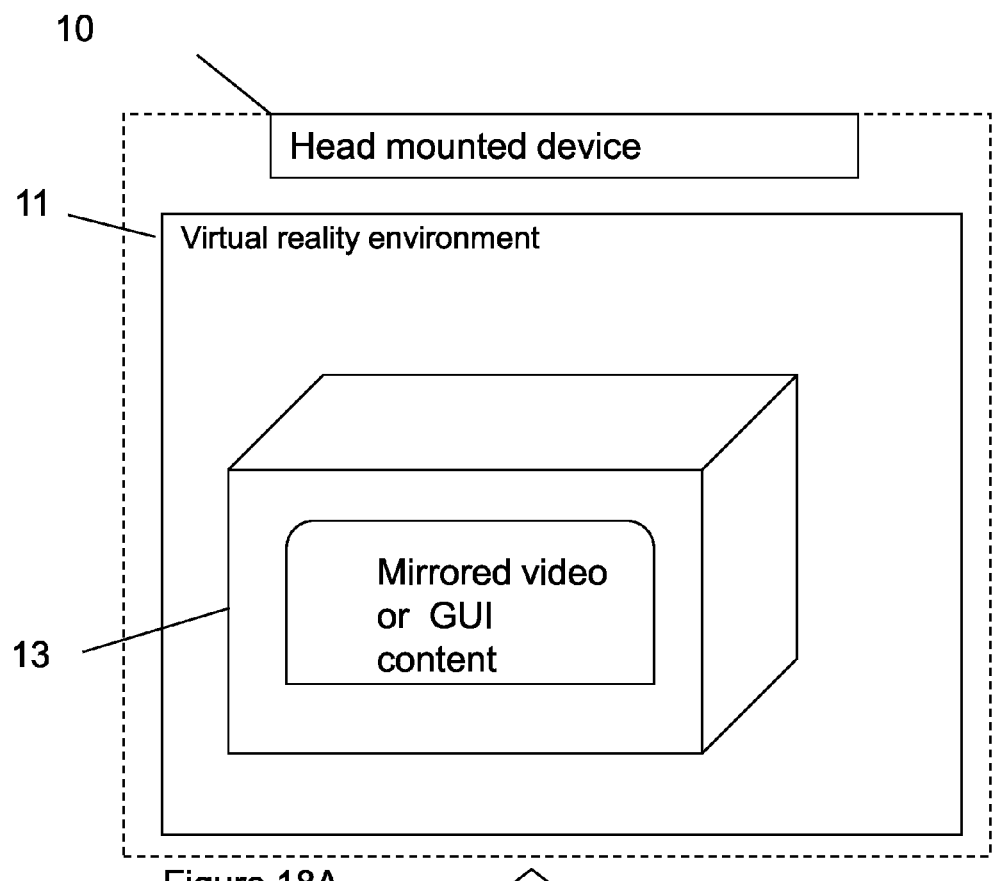
FIGS. 18A and 18B depict the action of display-content mirroring from a selected mobile device 20 to the Head mounted display unit 10, according to some embodiments of the invention.
Figure 18B:
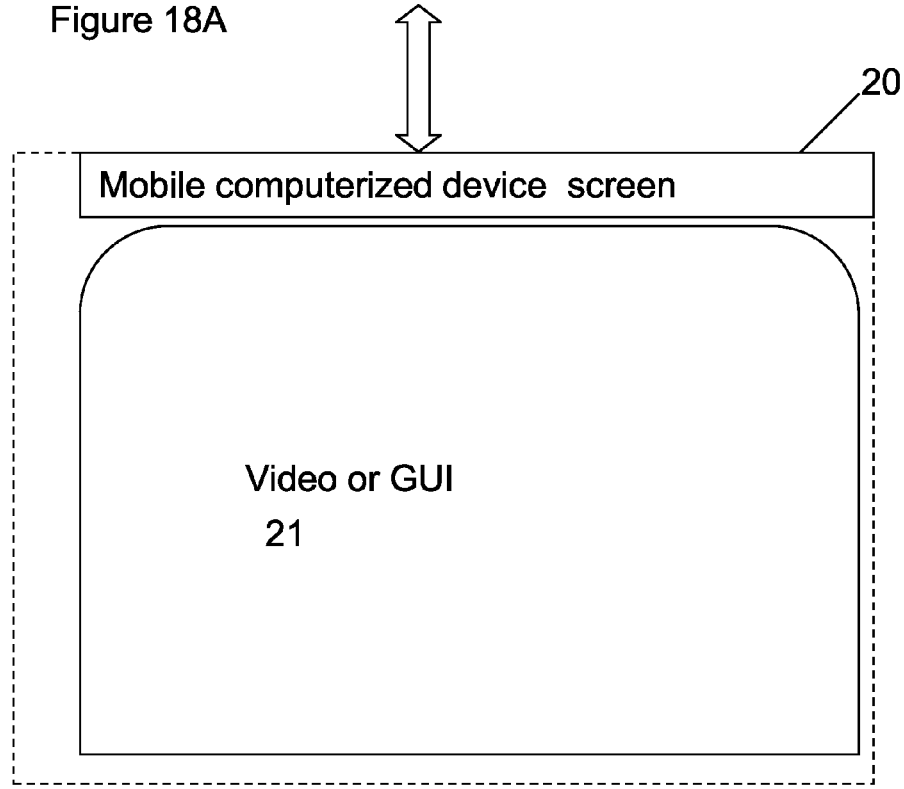

FIGS. 18A and 18B depict the action of display-content mirroring from a selected mobile device 20 to the Head mounted display unit 10, according to some embodiments of the invention. The content displayed 21 on the screen of the source device (e.g. a video sequence or GUI dialog) is displayed within the VR 3D environment 11. According to some embodiments of the present invention, the mirrored content may be displayed as a 2D projection on a face of a Virtual 3D geometrical solid 13 (e.g. a cube).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for supporting usage of at least one computerized source device from within a simulated Virtual Reality (VR) environment, produced by a head mounted VR device, implemented by one or more processors operatively coupled to a non-transitory computer readable storage device, on which are stored modules of instruction code that when executed cause the one or more processors to perform:
    receiving a content of a display of the at least one computerized source device as streaming video data from the source device;
    presenting a virtual 3-D surface within the VR environment;
    displaying said video content within the VR environment, as a 2-D video projection over said virtual 3-D surface;
    simulating an effect of a real-life field of view in the VR environment; and
    conserving bandwidth of streaming data from source devices that are not within a user of the head mounted VR device's direct line of sight,
    wherein in case of identifying that a projected display of a source device lies beyond a user's angle of view in the VR environment, the at least one computerized source device will stop streaming of video content to the head mounted virtual reality device, and the VR device will stop the display thereof.

2. The method of claim 1, further comprising the following steps of:
    identifying head gestures, tilts and movements of the head-mounted VR device;
    moving, rotating or titling said 3-D surface in a VR space, in association with said identified head gestures, tilts and movements of a head-mounted VR device; and
    moving or altering said streaming video projection in association with said identified head gestures, tilts and movements of the head-mounted VR device, as if the projected video has moved, rotated or tilted with a surface of a 3D object.

3. The method of claim 1, wherein the at least one computerized source device is connected to the head-mounted VR device via a wired or wireless local area network (LAN), or a wide area network (WAN).

4. The method of claim 1, wherein a user of the head-mounted VR device can select which computerized source device display or non-display-visual-content video stream to present as projected video in the VR environment.

5. The method of claim 1, further enabling a user of the head-mounted VR device to interact with a video projection of at least one mirrored source device, by identifying head movements and limb gestures, so as to apply actions on said video projection.

6. The method of claim 5, wherein the said actions are applied to the said at least one mirrored source device.

7. The method of claim 1, further enabling a user of the head-mounted VR device to verbally interact with a video projection of at least one mirrored source device display, said method comprising the steps of:
- emitting a verbal instruction by the user of the head-mounted VR device;
- recognizing the verbal instruction as one of a list of predefined verbal instructions by applying a voice recognition algorithm; and
- applying the recognized verbal instruction on the video projection of the at least one mirrored source device display.

8. The method of claim 1, further enabling a user of the VR display device to be alerted of an occurrence of any predefined event on any source device which is displayed within the VR environment.

9. A system for supporting usage of at least one computerized source device from within a Virtual Reality (VR) environment, produced by a head mounted VR device, comprising a non-transitory computer readable storage device and one or more processors operatively coupled to the storage device on which are stored modules of instruction code executable by the one or more processors, said system comprised of:
- a VR mirroring module, for receiving video streams of a display of said at least one computerized source device from at least one source device;
- a VR display integrator module, for projecting a 2-D display of the at least one source device over at least one virtual 3-D surface within the VR environment;
- wherein a head gestures module identifies a condition in which the projected video of a source device lies beyond a user's angle of view in the VR environment, in which case:
  - the VR display integrator module stops displaying a projected video of mirrored content from the source device that is out of the user's focus, and
  - the VR mirroring module consequently stops streaming video content from the device to the head mounted virtual reality device, thus conserving bandwidth of streaming data from source devices that are out of the user's focus.

10. The system of claim 9, further comprising a head gestures module, which identifies head gestures, tilts and movements of the head-mounted VR display device, wherein the VR display integrator module further moves the 3-D surfaces and projected video in the VR space, in association with said identified head gestures, tilts and movements of the head-mounted VR device.

11. The system of claim 9, wherein the at least one computerized source device is connected to the head-mounted VR device via a wired or wireless local area network (LAN), or a wide area network (WAN).

12. The system of claim 9, further comprising a source selection module, enabling the user of the head-mounted VR device to select which computerized source device display and/or video stream to display in the VR environment.

13. The system of claim 9, further comprising a motion detection module, enabling a user of the head-mounted VR device to interact with a video projection of an at least one mirrored source device display, and apply actions on the said video projection by:
- identifying head movements by the head gestures module; and
- identifying limb gestures by the motion detection module.

14. The system of claim 9, further comprising a voice detection module, enabling a user of the head-mounted VR device to interact with a video projection of an at least one mirrored source device display, and apply actions on the video projection by emitting verbal instructions.

15. The system of claim 9, further comprising a VR-Downlink module, enabling actions that are applied to video projections in the VR environment by verbal instructions or head gestures or limb movements to be applied to the at least one computerized source device.

16. The system of claim 9, further comprising a VR alerts module, enabling a user of the VR display device to be alerted of an occurrence of any predefined event on any presented source device.

17. A method for supporting usage of at least one computerized source device from within a simulated Virtual Reality (VR) environment, produced by a head mounted VR device, implemented by one or more processors operatively coupled to a non-transitory computer readable storage device, on which are stored modules of instruction code that when executed cause the one or more processors to perform:
- receiving video content of the display of the at least one computerized source device as streaming video data from the source device;
- presenting a virtual 3-D surface within the VR environment;
- displaying the received video content within the VR environment, as a 2-D video projection over the virtual 3-D surface;
- relating to different levels of focus of the projected video in the virtual reality environment, in accordance with a user's angle of view and direct line of sight, to simulate an effect of a real-life field of view in the VR environment; and
- conserving bandwidth of streaming data from a source device that is not within the user's direct line of sight, wherein, in case of identifying that a projected display of the source device lies within the user's angle of view, but not in the user's direct line of sight, a system will mirror the video content of the source device to the head mounted virtual reality device, and display the content in moderate resolution adapted to the relative location of the device within the line of sight.

18. A method for supporting usage of at least one computerized source device from within a simulated Virtual Reality (VR) environment, produced by a head mounted VR device, implemented by one or more processors operatively coupled to a non-transitory computer readable storage device, on which are stored modules of instruction code that when executed cause the one or more processors to perform:
- receiving video content of the display of the at least one computerized source device as streaming video data from the source device;
- presenting a virtual 3-D surface within the VR environment;
- displaying the video content within the VR environment, as a 2-D video projection over the virtual 3-D surface; and
- enabling sharing of the VR environment among multiple users of head-mounted VR devices,
- wherein each user is able to view and interact with all of, or a subset of the projected video of a mirrored source device display or a video stream originating from the at least one source device.

19. The method of claim 18, further enabling a user of the VR device to copy or move data residing on one of the at least one source device in one location to a different location, on the one of the at least one source device or on another source device, said method comprising:
  enabling the user to select a first source device;
  enabling the user to select specific content within a first location on the first source device;
  enabling the user to indicate whether to move or copy the selected specific content from the first location on the first selected source device to a second location, either on the first selected source device or on a different source device, by identifying head gestures or limb movements of the user; and
  copying or moving a selected content from the first location to the second location, either directly or via a memory device associated with the VR device.

20. A system for supporting usage of at least one computerized source device from within a Virtual Reality (VR) environment, produced by a head mounted VR device, comprising a non-transitory computer readable storage device and one or more processors operatively coupled to the storage device on which are stored modules of instruction code executable by the one or more processors, said system comprised of:
  a VR mirroring module, for receiving video streams of a display of said at least one computerized source device from at least one computerized source device;
  a VR display integrator module, for projecting a 2-D display of the at least one computerized source device over at least one virtual 3-D surface within the VR environment;
  wherein a head gestures module is configured to identify a condition in which a projected video of one of the at least one computerized source device lies within a user's angle of view, but not in a user's direct line of sight, in which case:
    the VR display integrator displays the projected video from the at least one computerized source device in moderate resolution, wherein the moderate resolution is dependent on a relative location of the one of the at least one computerized source device within the user's line of sight; and
    the VR mirroring module consequently consumes moderate bandwidth for a video stream of the one of the at least one computerized source device, thus conserving bandwidth of streaming data from source devices that are out of a focus of the user to simulate a real-life field of view in the VR environment.

21. A system for supporting usage of at least one computerized source device from within a Virtual Reality (VR) environment, produced by a head mounted VR device, comprising a non-transitory computer readable storage device and one or more processors operatively coupled to the storage device on which are stored modules of instruction code executable by the one or more processors, said system comprised of:
  a VR mirroring module, for receiving video streams of a display of said at least one computerized source device from at least one source device;
  a VR display integrator module, for projecting a 2-D display of the at least one source device over at least one virtual 3-D surface within the VR environment; and
  a sharing module, enabling the sharing of the VR environment among multiple users of head-mounted VR devices, wherein each of the multiple users are able to view and interact with all of, or a subset of the projected 2-D display of at least one source device.

22. The system of claim 21, further enabling a user of the VR display device to copy and/or move data residing in a first location on a first source device to a second location, either on the first source device or on a second source device, wherein:
  a source selection module enables the user to select a first source device;
  a head gestures module and/or motion detection module respectively identifying head gestures and/or limb movements, enabling the user to select specific content within a first location on the first source device; and
  the head gestures module and/or motion detection module respectively:
    identifying head gestures and/or limb movements, enabling the user to indicate whether to move or copy the selected specific content from the first location to a second location on the first source device or on a second source device, and
    copying or moving a selected content from the first location to the second location, either directly or via a memory device associated with the VR display device.

* * * * *